(12) United States Patent
Vu

(10) Patent No.: US 8,993,149 B2
(45) Date of Patent: Mar. 31, 2015

(54) CRIMPED, PRISMATIC BATTERY STRUCTURE

(75) Inventor: Viet Vu, Canton, MI (US)

(73) Assignee: A123 Systems LLC, Livonia, MI (US)

( * ) Notice: Subject to any disclaimer, the term of this patent is extended or adjusted under 35 U.S.C. 154(b) by 154 days.

(21) Appl. No.: 13/702,046

(22) PCT Filed: Jun. 2, 2011

(86) PCT No.: PCT/US2011/038873
§ 371 (c)(1),
(2), (4) Date: Jul. 23, 2013

(87) PCT Pub. No.: WO2011/153312
PCT Pub. Date: Dec. 8, 2011

(65) Prior Publication Data
US 2013/0295435 A1    Nov. 7, 2013

Related U.S. Application Data

(60) Provisional application No. 61/351,526, filed on Jun. 4, 2010.

(51) Int. Cl.
*H01M 6/42* (2006.01)
*H01M 2/02* (2006.01)
*H01M 2/04* (2006.01)
*H01M 2/30* (2006.01)

(52) U.S. Cl.
CPC ............ *H01M 2/024* (2013.01); *H01M 2/0217* (2013.01); *H01M 2/0413* (2013.01); *H01M 2/30* (2013.01)
USPC ............ 429/157; 429/151; 429/153; 429/163

(58) Field of Classification Search
CPC . H01M 2/0217; H01M 10/5032; H01M 2/04; H01M 2/0408; H01M 2/1061
USPC .................................. 429/157, 163, 153, 151
See application file for complete search history.

(56) References Cited

U.S. PATENT DOCUMENTS

| 6,887,618 B2 * | 5/2005 | Shelekhin et al. ............. 429/175 |
| 2004/0265687 A1 * | 12/2004 | Chan et al. ..................... 429/152 |
| 2005/0037258 A1 | 2/2005 | Itoh et al. |
| 2009/0206096 A1 * | 8/2009 | Hirotsu et al. ................ 220/612 |

FOREIGN PATENT DOCUMENTS

| EP | 1886740 A1 | 2/2008 |
| WO | 2004073093 A2 | 8/2004 |

OTHER PUBLICATIONS

International Search Report, PCT/US2011/038873, Dec. 20, 2011.

* cited by examiner

*Primary Examiner* — Jane Rhee
(74) *Attorney, Agent, or Firm* — Alleman Hall McCoy Russell & Tuttle LLP

(57) ABSTRACT

A battery housing is comprised of a unitary, seamless base member having a generally planar, quadrilateral bottom face with a side wall extending therefrom. The length dimension of the bottom face is at least twice the height of the side wall. The base member has an open top face. The housing includes a cover which closes the open top face and is engageable with the side wall of the base. An electrically resistive sealing gasket is configured to contact the cover member and the side wall so as to provide a fluid-tight seal. The components are mechanically interlocked by crimping or hemming. The housing is specifically configured to accommodate stacking of individual batteries into power assemblies, and the geometry of the housing optimizes thermal management. Further disclosed are batteries and battery assemblies including the housing.

16 Claims, 7 Drawing Sheets

CRIMPED, PRISMATIC BATTERY STRUCTURE

CROSS-REFERENCE TO RELATED APPLICATIONS

This application is the U.S. national phase of PCT/US2011/038873 filed Jun. 2, 2011, which claims priority of U.S. Provisional Patent Application Ser. No. 61/351,526, filed Jun. 4, 2010, and entitled "Crimped, Prismatic Battery Structure", the disclosure of which is incorporated herein by reference.

FIELD OF THE INVENTION

This invention relates generally to battery systems. More specifically, the invention relates to a battery module which employs a particular housing construction based upon a crimped, sealed structure and to power systems based on assemblages of such modules.

BACKGROUND OF THE INVENTION

The housing of a battery functions to retain and protect the electrochemically active components of a battery stack while also allowing for extraction of electrical power therefrom. The battery housing isolates the electrolytes and other potentially reactive components of the battery from oxygen, moisture, and other detrimental components of an ambient atmosphere. A battery housing should be lightweight and rugged, and its use and fabrication should be simple and inexpensive to implement. Furthermore, the housing should be configured to facilitate the assembly of power systems comprised of a plurality of battery modules, while optimizing the management of thermal loads.

In some instances, battery components are disposed in flexible polymeric packages. While housings of this type are lightweight and low in cost, such packages tend to be permeable to moisture and oxygen, and problems are also encountered at the points at which electrode tabs or other structures must protrude from the package to allow for tapping of electrical current. Furthermore, such flexible packages can not readily be configured in stacked configurations. As such, such flexible packages are not generally employed in electrical vehicles and other such high power and/or long service life applications.

Metal battery housings can establish a superior seal against atmospheric contaminants while providing high strength, good thermal dissipation, and good electrical contact to battery components. However, certain problems do arise in connection with the use of metal battery housings. In general, cylindrical battery housing structures are relatively easy to fabricate. However, cylindrical battery structures do not provide for maximum packing density as may be required in electrical vehicle applications.

In some instances, battery housings are configured as prismatic structures which are understood to mean structures having a polygonal, and typically rectangular, profile. Such battery structures allow for high volume packing which maximizes power density. In addition, the relatively large exterior surface area allows for very good heat dissipation. Cost has been a significant problem, which has limited the use of such prismatic battery structures since their construction typically requires the use of relatively expensive, deep drawn metal structural components. In addition, sealing of such structures is typically required to be implemented by relatively expensive processes such as laser welding.

As will be explained hereinbelow, the present invention provides for an improved battery structure which employs a prismatic battery casing which can be fabricated without the use of any deep drawing or other expensive metal fabrication process. In addition, the battery housing of the present invention is configured so that it can be assembled utilizing relatively low cost crimping or hemming techniques. Furthermore, the housing of the present invention is configured to permit ready stacking of individual battery modules into power configurations, while minimizing interconnections and optimizing management of heat loads. These and other advantages of the present invention will be apparent from the drawings, descriptions, and discussion which follow.

BRIEF DESCRIPTION OF THE INVENTION

Disclosed is a battery housing comprising a unitary, seamless base member. The base member has a bottom face with a side wall extending therefrom, and an open top face. The bottom face of the base member is of a quadrilateral shape, such as a rectangular shape, and the length dimension of the bottom face is at least twice the height of the side wall. The battery housing further includes a cover member which is configured so as to be disposed in, and close, the top face of the base member, and to be engageable with the side wall of the base member. The housing further includes an electrically resistive sealing gasket configured to contact the cover member and the side wall of the base member when the cover is engaged with the base member.

In particular instances, the rectangular bottom face of the base member is configured so that its length is at least twice its width. In specific instances, the side wall is configured so as to define a recessed step portion at its junction with the base, and this step portion may, in particular instances, comprise no more than 20% of the total side wall height. The cover member may also include a recessed perimeter portion which defines a central, recessed, portion which corresponds to the stepped portion so as to facilitate stacking of the assembled housings.

In further instances, the side walls of the housing may include a groove or recess formed therein and the recess is operative to engage and support and the sealing gasket and the cover member. In some particular instances, the cover member is crimped into engagement with the sealing gasket so as to bias the gasket into contact with the side walls of the base. In other instances, the side walls are crimped into engagement with the sealing gasket so as to bias the gasket into engagement with the cover.

The gasket may comprise a polymeric material and in some instances may be injection molded onto the lid prior to the lid being attached to the base member.

Further disclosed is a battery structure based upon the aforedescribed housing. The battery structure includes a battery stack retained in the housing. The battery stack includes at least one anode and at least one cathode, and a first terminal in electrical communication with each of the at least one anode, and a second terminal in electrical communication with each of the at least one cathode. The battery stack further includes an ion permeable, electrically insulating separator membrane disposed so as to electrically insulate each of the at least one anode from each of the at least one cathode. A body of electrolyte material is disposed in fluid contact with the at least one anode and the at least one cathode so as to comprise a completed battery structure. In some instances, the battery stack is disposed so as to have the at least one anode establish electrical communication with the base member or the cover member, and the at least one cathode establish electrical communication with the other of the base member and cover member. Batteries of this type may be stacked in a series arrangement wherein the cover of one housing is in contact with the base of another housing; and in some instances, an electrically conductive filler material may be disposed between the stacked housings so as to establish better electrical contact.

Also disclosed are methods for manufacturing the housing structures.

DETAILED DESCRIPTION OF THE INVENTION

The battery housings of the present invention are configured so as to provide a battery structure which may be readily assembled into stacks of series and/or parallel connected batteries such that the stacks provide very good electrical contact, efficient use of space, and optimize heat dissipation. The structures of the present invention may be fabricated without the use of expensive metal forming techniques such as deep drawing techniques and may be readily assembled into reliable, sealed battery structures. The battery housings of the present invention may be implemented in a number of different configurations. The principles of the present invention will be explained with reference to some specific embodiments, and it is to be understood that other embodiments are within the scope of this invention.

Figure 1:
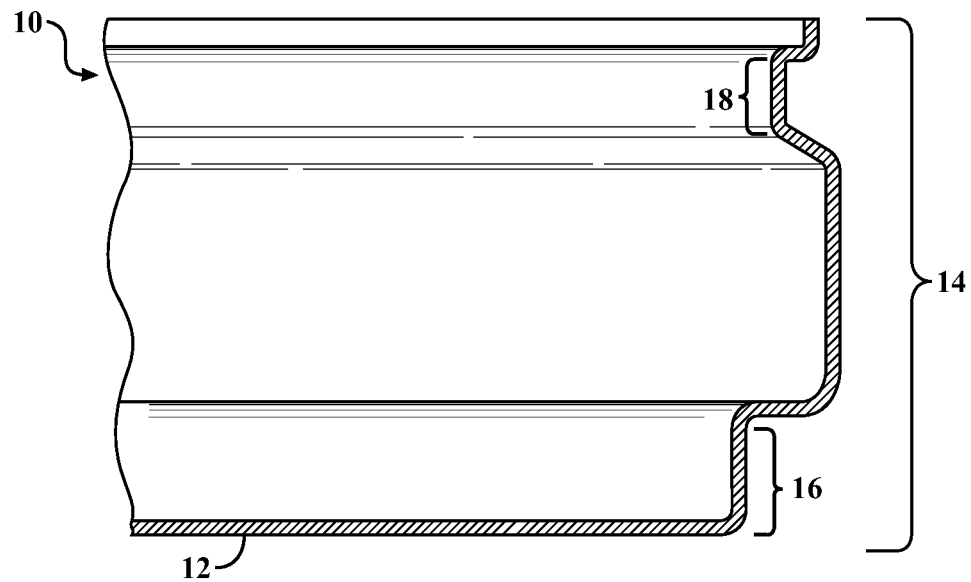
FIG. 1 is a cross-sectional view of a portion of a base member of a first embodiment of battery housing in accord with the present invention.

Referring now to FIG. 1, there is shown a partial cross-sectional view of one embodiment of base member 10 which may be utilized in the present invention. This base member is a unitary, seamless body of material, typically metal such as steel or aluminum. The housing 10 includes a generally planar bottom face 12 having a quadrilateral shape. Typically, the bottom face will be rectangular; and in particular instances, the length of the bottom face will be greater than the width of the bottom face. The housing 10 includes a side wall 14 which projects therefrom; and as will be seen, this side wall seamlessly joins to the perimeter of the bottom face.

In this FIG. 1 embodiment, it will be seen that the side wall 14 includes a recessed step portion 16 at its junction with the bottom face 12 of the base 10. This recessed step portion typically has a height which is no more than 20% of the total height of the side wall 14 and runs around the entire base member 10.

It will be further noted that in the FIG. 1 embodiment, the side wall 14 includes an upper groove or recess which is proximate the open, upper face of the base member 10. This recess 18 also runs around the entirety of the base. In one particular embodiment, the base member 10 is configured such that its overall length is approximately 74 millimeters and its length as measured at the bottom face 12 is 67.5 millimeters as a result of the presence of the step portion 16. In this particular embodiment, the overall height of the side wall 14 is 27.23 millimeters, and the height of the step portion is approximately 4.75 millimeters, while the height of the recessed portion 18 is approximately 3.63 millimeters, and the height of the remaining central portion is 18.85 millimeters. While dimensions may be varied depending on particular applications, in a typical embodiment, the height of the wall is no more than 50% of the length of the base. The fact that the housing is configured such that the side walls are relatively shallow compared to the length of the housing allows for the fabrication of the base by simple metal forming techniques such as single-step drawing or stamping, thereby minimizing costs of fabrication. Likewise, the presence of the step portion in the housing facilitates stacking of battery units. Furthermore, the configuration of the housing maximizes heat transfer between the bulk of individual battery units while preserving channels for cooling gas or liquids to flow therebetween, thereby optimizing heat management.

Figure 2:
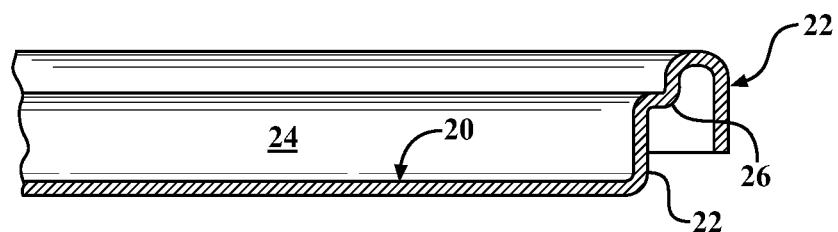
FIG. 2 is a cross-sectional view of a portion of a cover member configured to be engageable with the base member of FIG. 1.

Referring now to FIG. 2, there is shown a configuration of cover member 20 which may be utilized in conjunction with the housing 10 of FIG. 1. This cover 20 is typically fabricated from sheet metal utilizing relatively simple techniques such as stamping or single-step drawing. The cover 20 has a rectangular shape corresponding generally to the open top face of the base member. The cover 20 includes an engagement portion 22 which is configured to be engageable with the side wall of the base member. It is also notable that the cover member 20 includes a recessed perimeter portion 22 which defines a central recess 24 which, as will be explained hereinbelow, is configured to correspond generally to, and engage, the portion of the bottom face of the housing member as defined by the step portion 16 thereof. It is also notable that this perimeter portion 22 defines a shoulder 26 which can engage the recessed portion 18 of the base member 10.

Figure 3:
FIG. 3 is a cross-sectional view of a sealing gasket which may be utilized in conjunction with the base member of FIG. 1 and cover member of FIG. 2.

Referring now to FIG. 3, there is shown a cross-sectional view of a sealing gasket 30 which may be used to seal together the base member 10 and cover 20 of FIGS. 1 and 2 respectively. The gasket 30 is typically fabricated from an electrically resistive, resilient material such as a polymeric material. In particular instances, highly crystalline polymers have been found to provide a reliable and fluid-tight seal in applications of this type. One particular polymer having utility in the present invention comprises polypropylene. In other instances polyethylene, and in particular high-density polyethylene, may be utilized as a gasket material. Other polyolefins may be similarly employed for these purposes.

Figure 4A:
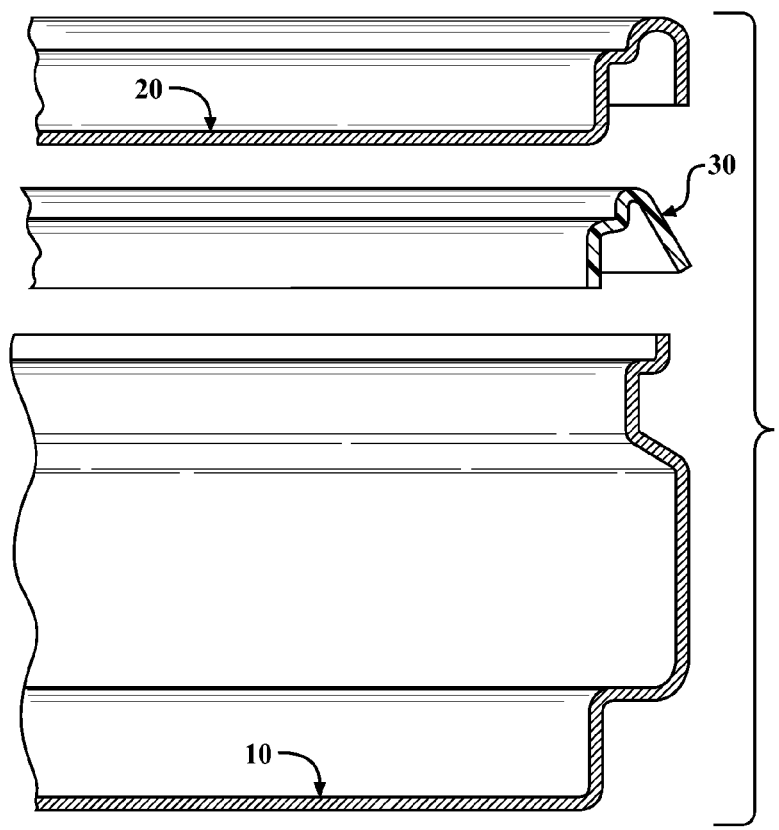
FIGS. 4A-4D show the sequential steps in assembling and sealing the components of the first embodiment of battery housing as shown in FIGS. 1-3.
Figure 4B:
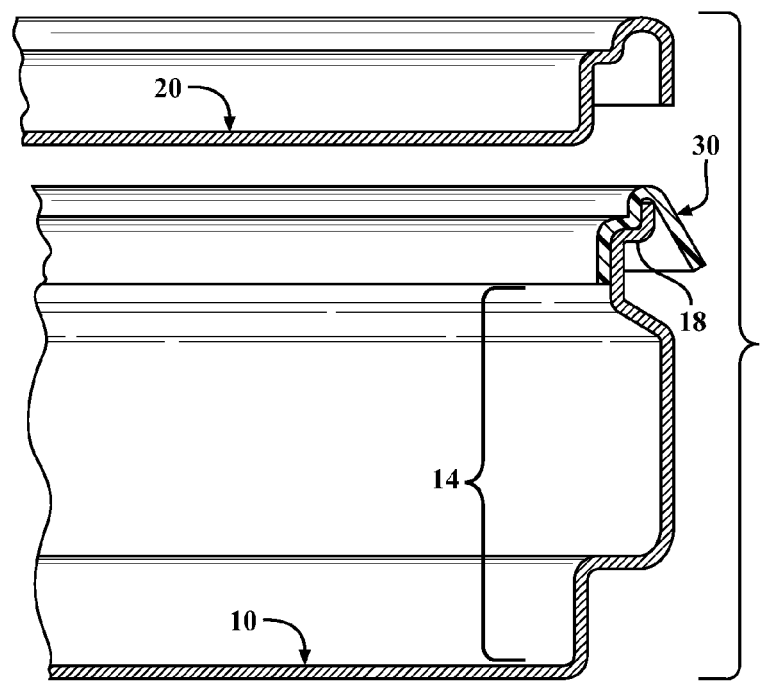

FIGS. 4A-4D schematically depict steps in the assembly of the components of FIGS. 1-3. In FIG. 4A, the base member 10, cover 20, and gasket 30 are shown in an exploded, preassembly state. As will be seen in FIG. 4B, the gasket 30 has been disposed so as to be supported by the base member 10 at the recessed portion 18 of the side wall 14. In some instances, an adhesive material may be applied to the sealing gasket 30 so as to aid in retaining it in engagement with the base member 10. However, this step is optional; and in many instances, the gasket 30 will not require any such adhesive. In some particular instances, the gasket 30 may be injection molded onto the base member 10 or, alternatively, it may be injection molded onto the cover 20.

Figure 4C:
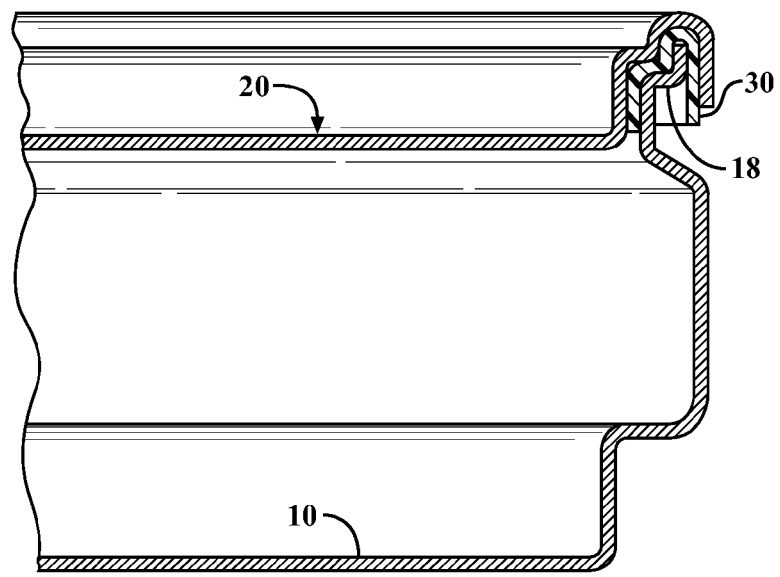
Figure 4D:
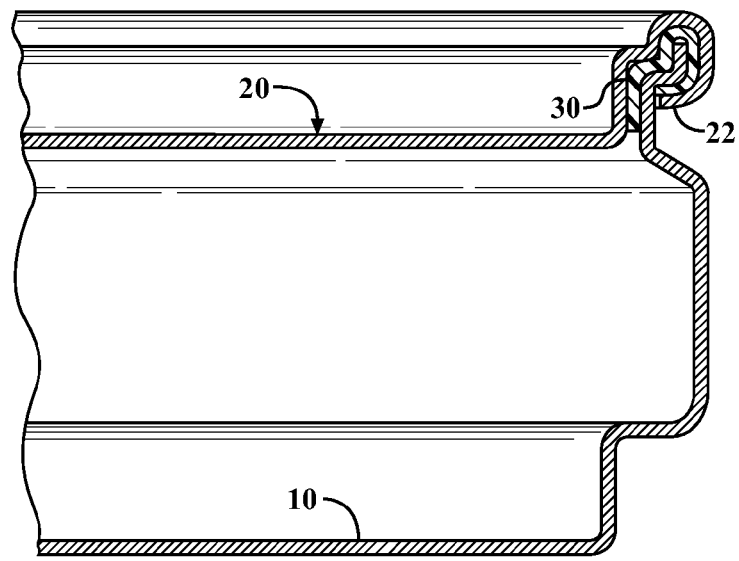

FIG. 4C shows the base member 10, cover 20, and gasket 30 as disposed in engagement. As will be seen, the recess 18 serves to support the gasket 30 and cover 20. FIG. 4D shows a final step in the assembly sequence in which the connector portion 22 of the lid 20 is crimped over so as to compress the gasket 30 against the base member 10 and effect a tight, moisture-proof seal. Crimping may be readily accomplished by various mechanical means, and it is significant that this design avoids the need for any expensive and/or complicated sealing steps such as laser welding or the like, as is typical in the prior art.

Figure 5:
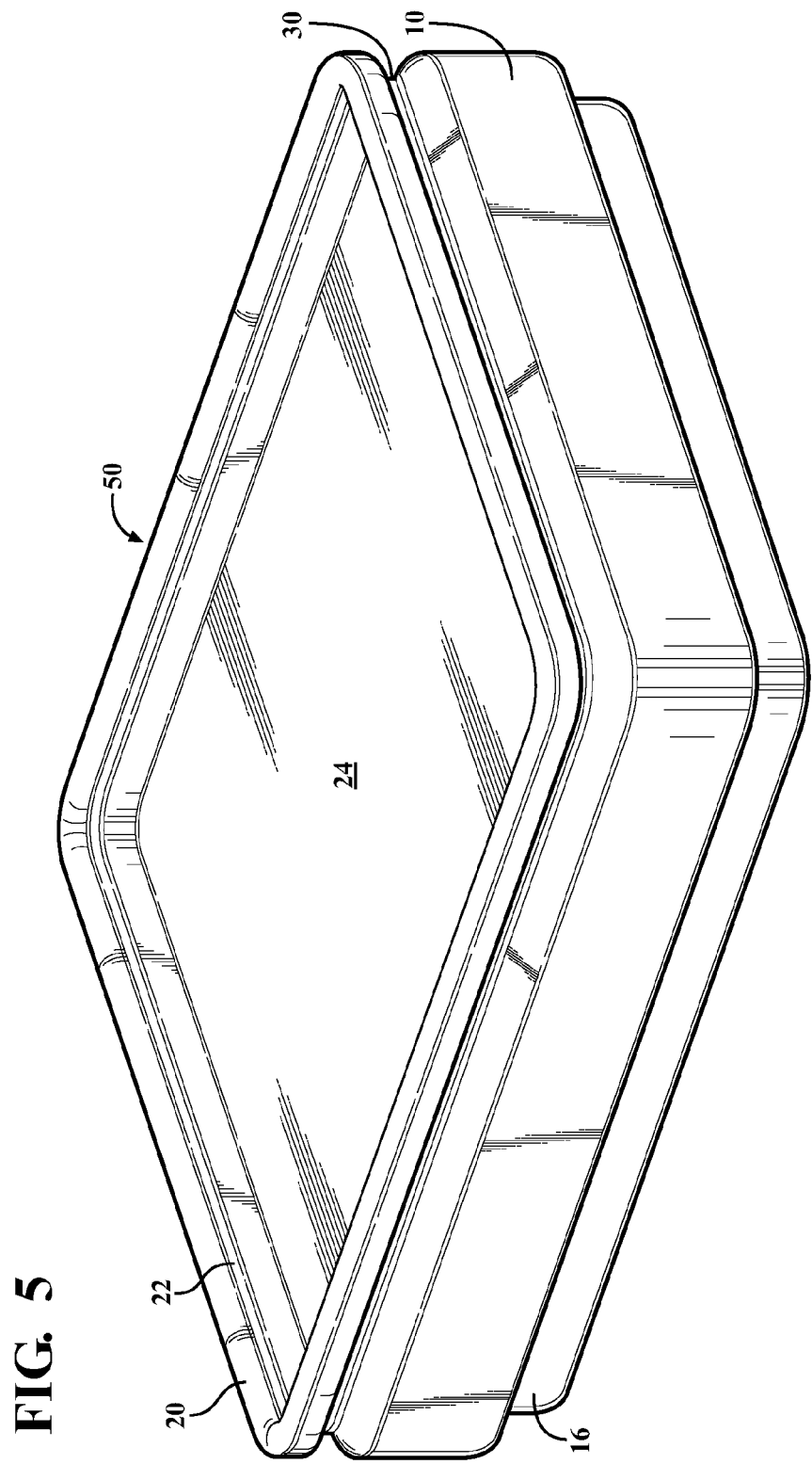
FIG. 5 is a perspective view of the components of FIGS. 1-3 as assembled into a first embodiment of battery housing.

Referring now to FIG. 5, there is shown a perspective view of a battery package 50 as assembled in accord with the foregoing. The assembled package 50 includes the base 10, cover 20, and gasket 30 as previously described. As will be noted, the step portion 16 extends around the base to define a stepped back portion, and the recessed perimeter portion 22 of the cover 20 forms a central recess 24 in the cover 20 which is generally configured to accommodate the stepped portion of the base of a corresponding cell 24.

The battery housing of the present invention is operative to contain a battery stack therein. As is known in the art, the battery stack will include one or more anodes, one or more cathodes, and an ion permeable, electrically resistive separator membrane disposed therebetween. When this arrangement of members is placed in an appropriate electrode, a battery structure is formed. The housing of the present invention is fluid tight and retains these members; and in particular instances, the anode members of the battery stack may be connected to the cover or to the base member so as to form one terminal of the electrode while the cathode members may be connected to the other of the cover and base to form the second terminal of a battery. In this manner, the housing itself will define battery terminals although it is to be understood that in other embodiments separate terminals may be incorporated.

Figure 6A:
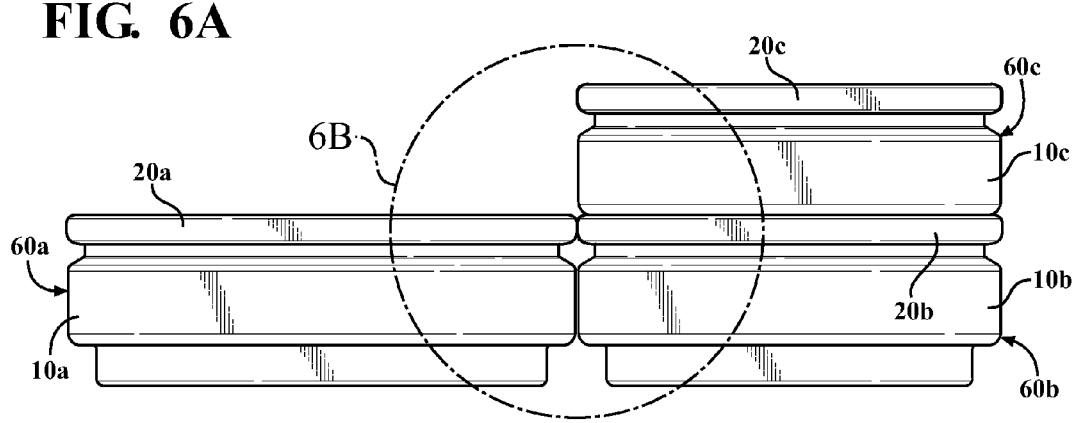
FIG. 6A is an illustration of a battery stack comprised of battery units of the type shown in FIG. 5.

Referring now to FIG. 6A, there is shown a portion of a battery stack which may be prepared utilizing the afore-described battery housings. As is shown in FIG. 6A, three batteries 60a, 60b, 60c are assembled into a stack. In each instance, the base member 10 forms one electrode of the battery and the cover member 20 forms the other terminal of the battery. In the FIG. 6A illustration, the base member 10a of the first battery 60a is in direct electrical contact with the base member 10b of the second battery 60b, and the cover member 20a of the first battery 60a is in direct electrical contact with the cover member 20b of the second battery 60b, thereby connecting the respective electrodes of batteries 60a and 60b in a parallel electrical relationship. The cover member 20b of the second battery 60b is also in electrical contact with the base member 10c of the third battery 60c thereby placing these two batteries in an electrical series relationship. It is to be understood that yet other batteries will be placed in this stack to produce a power pack. Typically, such an assemblage may include 80 to 100 individual modules and may generate 300 or more volts.

While in some instances, the respective housing components of the batteries 60 may be in direct electrical contact, in yet other embodiments, a layer of an electrically conductive material such as an electrically conductive paste or adhesive may be interposed between the components to aid in establishing a better electrical (and in some instances, thermal) connection.

Figure 6B:
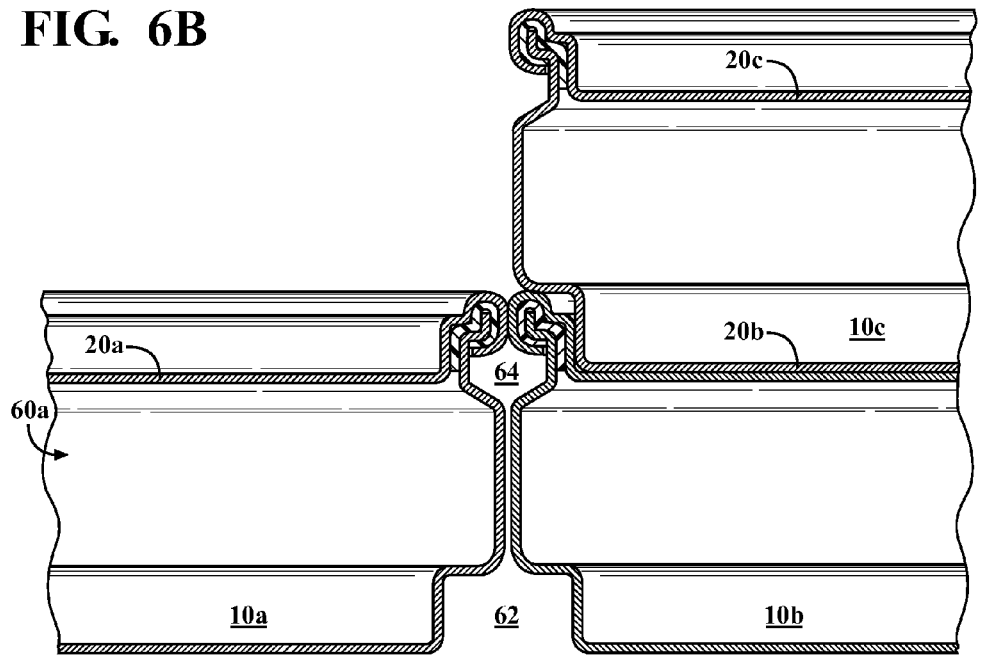
FIG. 6B is an enlarged view of a portion of the stack of FIG. 6A.

Referring now to FIG. 6B, there is shown an enlarged detail of the FIG. 6A drawing better illustrating the manner in which the individual battery modules 60a-60c are in contact. As will be seen, the configuration of the battery housings of the present invention allows for very good electrical contact between various members, while still providing open channels 62, 64 through the stack which facilitate cooling. Thus, the structure of the present invention provides for maximum thermal contact so as to distribute thermal mass between the cells while still allowing for large area cooling to take place.

Figure 7A:
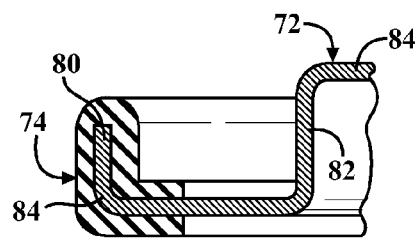
FIG. 7A is a cross-sectional view of a portion of a base member, cover member, and sealing gasket of another embodiment of the present invention as shown prior to assembly.
Figure 7A:
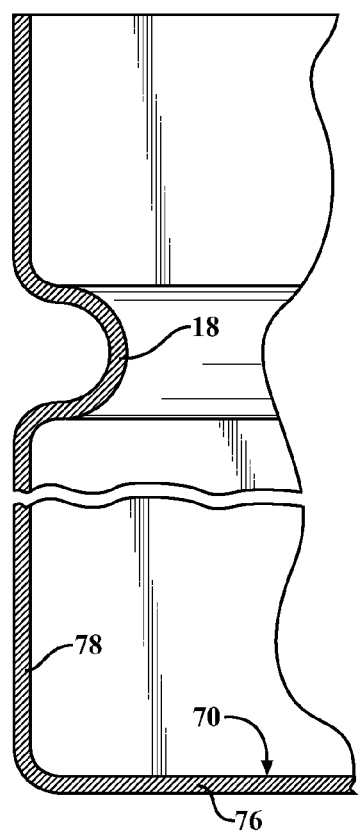
Figure 7B:
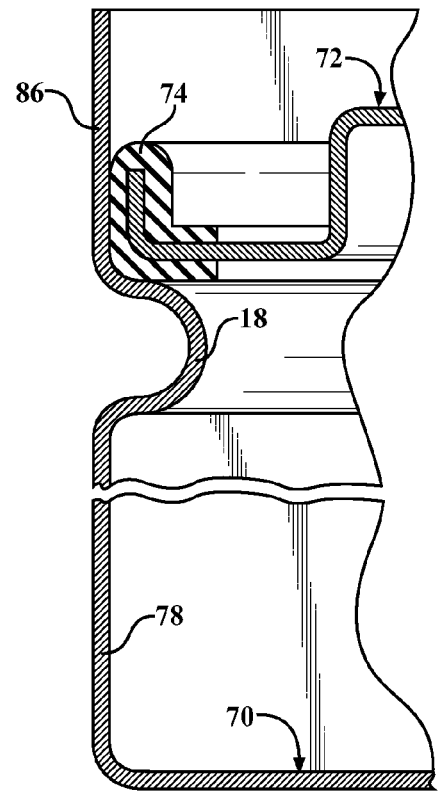
FIG. 7B shows the components of FIG. 7A in an assembled but uncrimped stage.
Figure 7C:
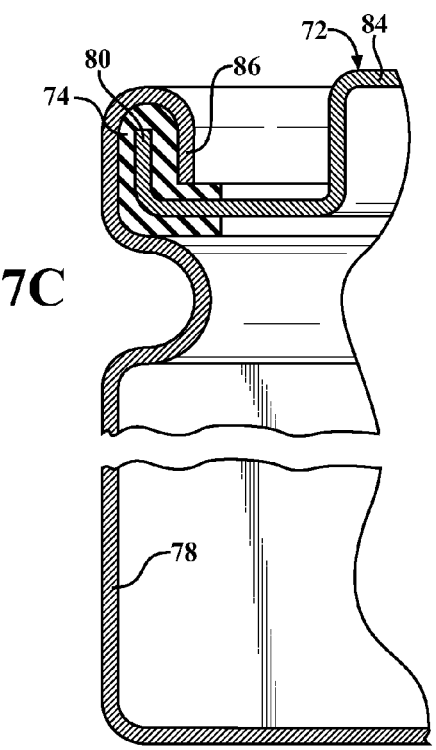
FIG. 7C shows the components of FIGS. 7A and 7B as crimped into a closed, sealed engagement.

The battery housing of the present invention may be implemented in yet other configurations, and FIGS. 7A-7C depict one such other embodiment. FIG. 7A shows partial cross-sectional views of a base member 70, cover member 72, and sealing gasket 74 of a second embodiment of battery housing. In the FIG. 7A embodiment, the base member 70 is also a unitary seamless member having a generally planar bottom face 76 which, as in the previous embodiment, is typically rectangular. A side wall 78 extends from the base; and as in the previous embodiment, the length dimension of the bottom face 76 of the base is at least twice the height of the side wall 78. In this embodiment, the side wall 78 does not include a stepped back portion as in the previous embodiment but does include a recess 18 proximate the open top of the base as previously described. The cover member 72 is shown as having the gasket 74 affixed thereto; and in particular instances, this gasket 74 may be directly injection molded onto the cover 72 but, in other instances, it may be affixed in a separate step. The cover 72 includes an upwardly projecting flange portion 80 which is covered by the gasket 74. It also includes a secondary upwardly projecting portion 82 which serves the purpose of raising the top face 84 of the cover to a level position with the remainder of the housing, as will be apparent from the drawings which follow.

In a second step of the assembly process, as is shown in FIG. 7B, the cover 72 with its attached gasket 74 is disposed so as to cover the open top face of the base member 70. In this regard, the recess 18 formed in the side wall 78 of the base member 70 engages and supports the cover/gasket assembly. It will be further noted that an upper portion 86 of the side wall 78 disposed above the recess 18 projects upward of the top surface of the gasket 74.

Referring now to FIG. 7C, there is shown a final step in the assembly of the battery package. In this step, the upwardly projecting portion 86 of the side wall 78 is crimped over so as to compress the gasket 74 against the flange portion 80 of the lid 72; and it will be noted that the upper face 84 of the cover 72 is approximately level with the remainder of the cell.

Figure 8:
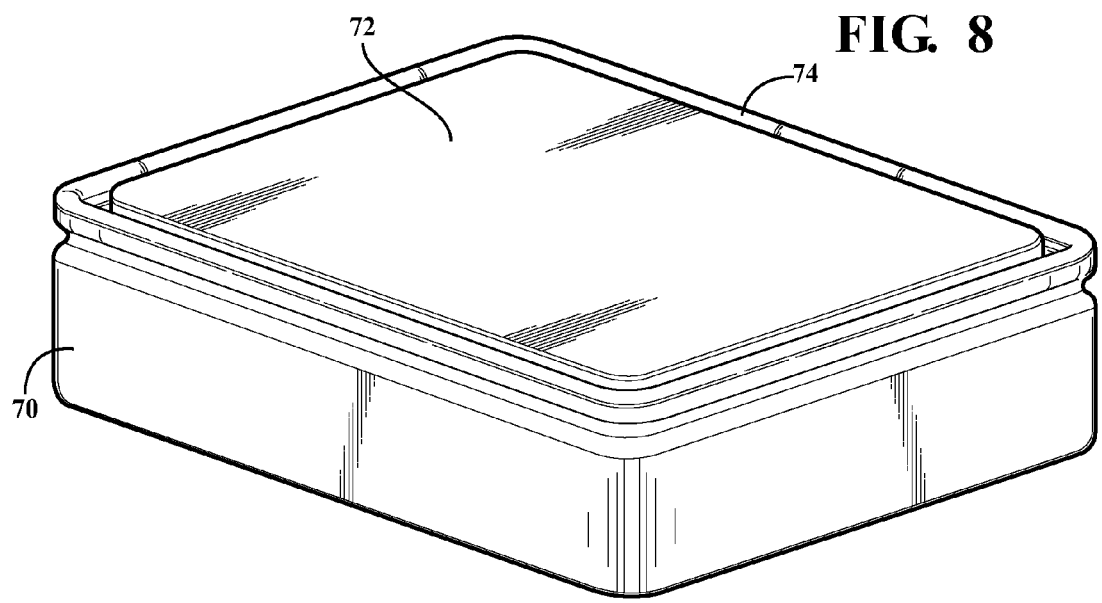
FIG. 8 shows a perspective view of a second embodiment of battery housing assembled from the components of FIGS. 7A-7C.

Referring now to FIG. 8, there is shown a perspective view of a completed battery package 90 in accord with this embodiment of the invention. As will be seen therein, the package includes the base member 70, cover member 72, and gasket 74.

This embodiment may be fabricated in a number of different configurations and sizes. In particular, this embodiment will be configured so that the length dimension of the base member, and hence the resultant battery, is at least twice its height dimension and so that the length dimension of the housing is at least twice the width dimension. In one particular embodiment, the length dimension of the housing is approximately 200 millimeters, the width dimension of the housing is approximately 75 millimeters, and the height dimension is approximately 47.5 millimeters.

The foregoing drawings and description are illustrative of some specific embodiments of the present invention and are not meant to be limitations upon the practice thereof. Further modifications and variations will be apparent to those of skill in the art in view of the teaching presented herein. It is the following claims, including all equivalents, which define the scope of the invention.

The invention claimed is:

1. A battery housing comprising:
a unitary, seamless base member having a generally planar, quadrilateral, bottom face with a side wall extending therefrom, wherein the length dimension of said bottom face is at least twice the height of the side wall, said base member having an open top face and wherein said side wall includes a recessed step portion at its junction with the bottom face of the base;
a cover member configured to be disposed in the open top face of said base member and to be engageable with the side wall of said base wherein said cover member includes a recessed perimeter portion which defines a central recess which corresponds to said step portion; and
an electrically resistive sealing gasket configured to be interposed between and to contact said cover member and said side wall of said base member when said cover member is engaged with said side wall of said base member.

2. The battery housing of claim 1, wherein the quadrilateral bottom face of said base member is rectangular.

3. The battery housing of claim 2, wherein the length dimension of said bottom face is at least twice the width dimension thereof.

4. The battery housing of claim 1, wherein said step portion has a height dimension which is no more than 20% of the total height dimension of the side wall.

5. The battery housing of claim 1, wherein said side wall includes a recess formed therein proximate to the open top face of the base member, said recess being operative to engage and support said sealing gasket and said cover member.

6. The battery housing of claim 1, wherein said cover member is crimped into engagement with said sealing gasket so as to bias said sealing gasket into contact with the side wall of said base so as to establish a seal therebetween.

7. The battery housing of claim 1, wherein said side wall is crimped into engagement with said sealing gasket so as to bias said sealing gasket into contact with the cover member so as to establish a seal therebetween.

8. The battery housing of claim 1, wherein said gasket is fabricated from a polymeric material.

9. The battery housing of claim 8, wherein said polymeric material is selected from the group consisting of polypropylene, polyethylene, high density polyethylene, a polyolefin, and combinations thereof.

10. The battery housing of claim 8, wherein said gasket is injection molded onto the cover member or the base member.

11. The battery housing of claim 1, wherein said base member and said cover member are fabricated from a metal.

12. A battery, said battery comprising:
the housing of claim 1;
a battery stack retained in said housing, said battery stack comprising at least one anode; a first terminal in electrical communication with each of said at least one anode; at least one cathode; a second terminal in electrical communication with each of said at least one cathode wherein said first terminal is in electrical communication with one of said base member and said cover member, and the second terminal is in electrical communication with the other of said base member and cover member; and an ion permeable, electrically insulating separator membrane disposed so as to electrically insulate each of said at least one anode from each of said at least one cathode; and
a body of electrolyte material disposed in fluid contact with said at least one anode and said at least one cathode.

13. A battery stack comprising at least two of the batteries of claim 12 disposed in a stacked relationship so that the base member of one of said at least two batteries is in electrical contact with the cover member of another of said at least two batteries.

14. A battery stack comprising at least two of the batteries of claim 12 disposed in a side by side relationship so that the base member of one of said at least two batteries is in electrical contact with the base member of another of said at least two batteries.

15. The battery stack of claim 12 further including an electrically conductive filler material disposed between at least a portion of the housing of one of said at least two batteries and at least a portion of the housing of another of said at least two batteries so as to establish electrical contact therebetween.

16. A method for constructing a battery housing, said method comprising the steps of:
providing a unitary, seamless base member having a generally planar, quadrilateral bottom face with a side wall extending therefrom, wherein the length dimension of said bottom face is at least twice the height of the side wall, said base member having an open top face wherein said base member is configured so that the side wall thereof includes a recessed step portion at its junction with the bottom face of the base member;
providing a cover member which is configured to be disposed in the top face of said base member and to be engageable with the side wall of said base wherein said cover member includes a central recess corresponding to the step portion of said side walls;
providing an electrically resistive sealing gasket configured to contact said cover member and the side wall of said base member when said cover is engaged with the side wall of said base;
disposing said cover member and said sealing gasket in engagement with said base member so that said cover member is disposed in and closes the top face of said base member and so that said gasket member is interposed between, and contacts said cover member and said base member; and
forming a crimp seal between said cover member and said base member so as to compress said sealing gasket therebetween.

* * * * *